US012568186B2

(12) United States Patent
Pati et al.

(10) Patent No.: US 12,568,186 B2
(45) Date of Patent: Mar. 3, 2026

(54) SYSTEMS AND METHODS FOR VIDEO-BASED COLLABORATION INTERFACE

(71) Applicant: Verizon Patent and Licensing Inc., Basking Ridge, NJ (US)

(72) Inventors: Satya Pati, Bangalore (IN); Suresh Halarneker, Bangalore (IN); Trisha Chatterjee, Bangalore (IN); Ragesh Viruthissery, Bangalore (IN); Santosh Holla K S, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 383 days.

(21) Appl. No.: 18/145,889

(22) Filed: Dec. 23, 2022

(65) Prior Publication Data

US 2024/0214519 A1 Jun. 27, 2024

(51) Int. Cl.
*H04N 7/14* (2006.01)
*G10L 15/26* (2006.01)
*H04L 67/306* (2022.01)
*H04N 7/15* (2006.01)

(52) U.S. Cl.
CPC ............. *H04N 7/147* (2013.01); *G10L 15/26* (2013.01); *H04L 67/306* (2013.01); *H04N 7/15* (2013.01)

(58) Field of Classification Search
CPC . H04N 7/147; H04N 7/15; H04N 7/14; G10L 15/26; H04L 67/306
See application file for complete search history.

(56) References Cited

U.S. PATENT DOCUMENTS

2007/0143103 A1* 6/2007 Asthana ................ H04M 3/567
704/200
2015/0187112 A1* 7/2015 Rozen .................... G06T 13/40
345/473
2021/0076002 A1* 3/2021 Peters ................... H04N 7/152

* cited by examiner

*Primary Examiner* — Yosef K Laekemariam

(57) ABSTRACT

A method, a device, and a non-transitory storage medium are described in which a video-based collaboration assistance service is provided. The service may include identifying a user profile for a user of a videoconferencing application to access a videoconferencing session. The service may convert statements expressed by participants of the videoconferencing session to text data. The service may determine an expressive context quality of the text data. The service may create, using the text data and the expressive context quality, discussion threads and corresponding expressive context indicators. The service may also generate, based on the user profile, a graphical interface including select ones of the discussion threads including one or more of the expressive context indicators for presenting via the videoconferencing application.

20 Claims, 10 Drawing Sheets

200

500

REGISTER USERS WITH VIDEOCONFERENCING APP/SERVICE
510

GENERATE USER PROFILES FOR REGISTERED USERS
520

ASSIGN ACCESSIBLITY ASSISTANCE LEVEL AND/OR MODE TO USER
530

ESTABLISH A VIDEO-BASED COMMUNICATION SESSION VIA V/C APP
540

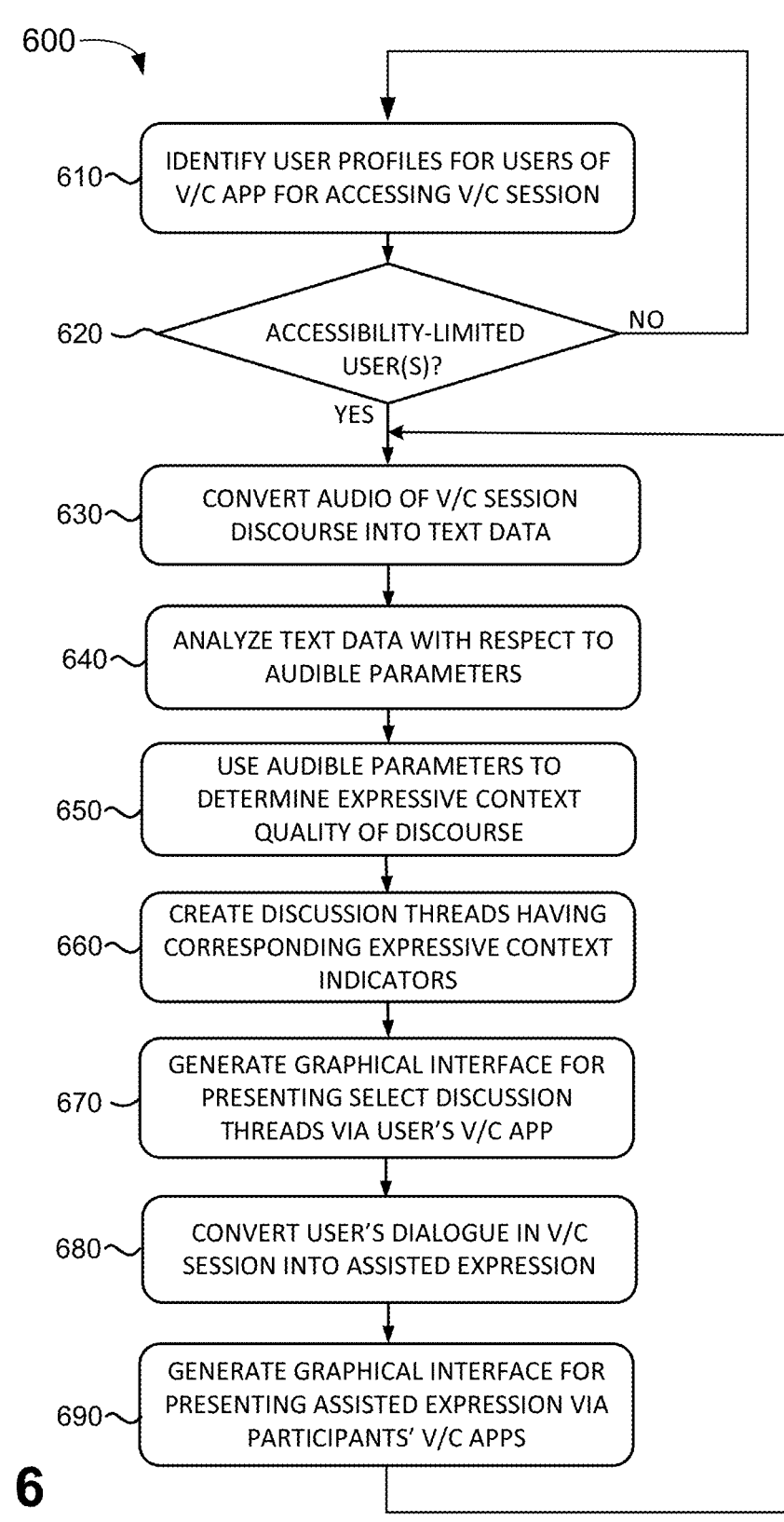

600

610 — IDENTIFY USER PROFILES FOR USERS OF V/C APP FOR ACCESSING V/C SESSION

620 — ACCESSIBILITY-LIMITED USER(S)?

NO

YES

630 — CONVERT AUDIO OF V/C SESSION DISCOURSE INTO TEXT DATA

640 — ANALYZE TEXT DATA WITH RESPECT TO AUDIBLE PARAMETERS

650 — USE AUDIBLE PARAMETERS TO DETERMINE EXPRESSIVE CONTEXT QUALITY OF DISCOURSE

660 — CREATE DISCUSSION THREADS HAVING CORRESPONDING EXPRESSIVE CONTEXT INDICATORS

670 — GENERATE GRAPHICAL INTERFACE FOR PRESENTING SELECT DISCUSSION THREADS VIA USER'S V/C APP

680 — CONVERT USER'S DIALOGUE IN V/C SESSION INTO ASSISTED EXPRESSION

690 — GENERATE GRAPHICAL INTERFACE FOR PRESENTING ASSISTED EXPRESSION VIA PARTICIPANTS' V/C APPS

FIG. 6

SYSTEMS AND METHODS FOR VIDEO-BASED COLLABORATION INTERFACE

BACKGROUND

Video-based collaboration systems enable multiple participants from remote endpoints to teleconference using audio and/or video technology. Customization of the interactive user experience according to the participants' own communication faculties remains an ongoing issue.

BRIEF DESCRIPTION OF THE DRAWINGS

FIG. 6 is a flow diagram illustrating yet another exemplary process of an exemplary embodiment of the videoconferencing accessibility service.

DETAILED DESCRIPTION

Figure 1:
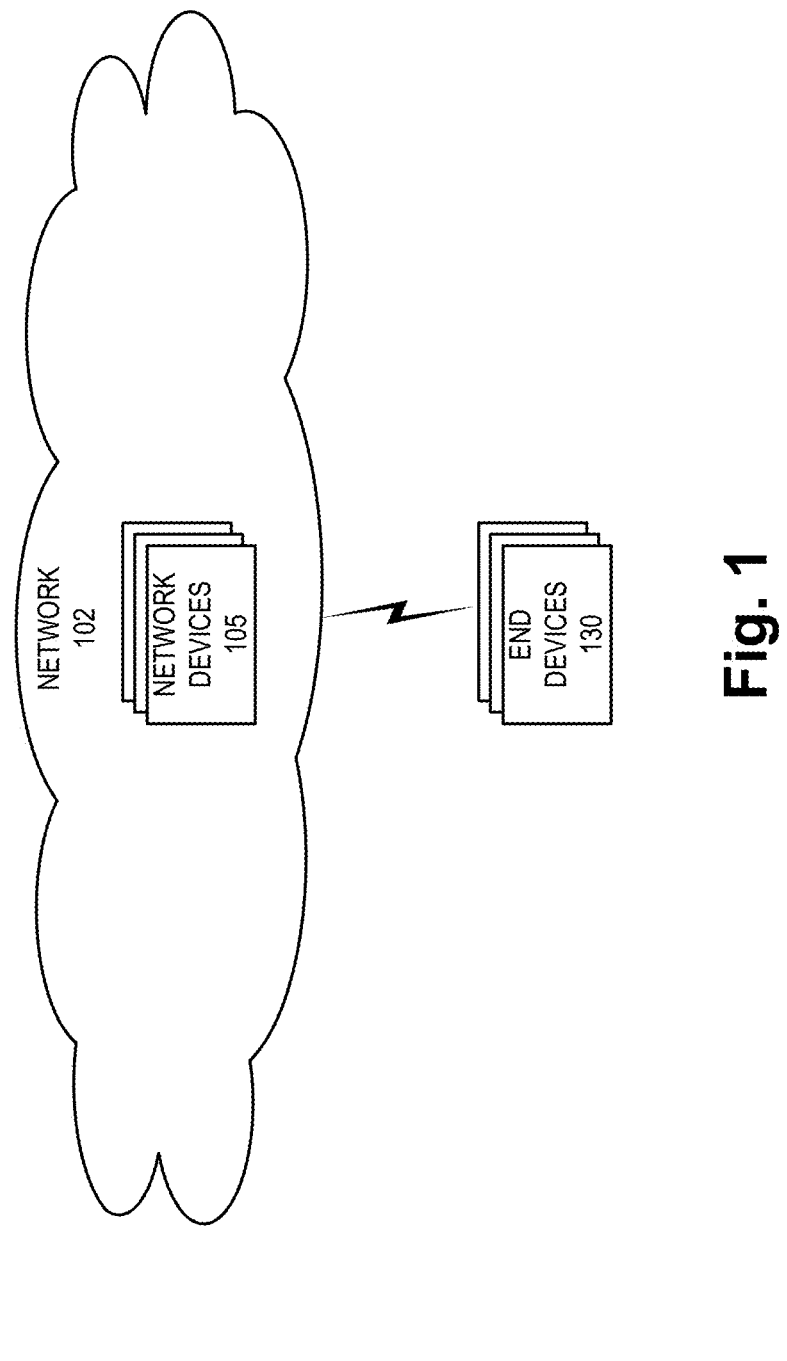
FIG. 1 is a diagram illustrating an exemplary environment in which an exemplary embodiment of a videoconferencing accessibility service may be implemented.

The following detailed description refers to the accompanying drawings. The same reference numbers in different drawings may identify the same or similar elements. Also, the following detailed description does not limit the invention.

Videoconferencing software and the like may allow a host or hosts to initiate a videoconferencing session and invite others to join. The host and invitee(s) may participate in the session using devices such as user devices. The user devices may have a camera to capture video of the participants and/or a microphone to capture their audio. The video and/or audio content is transmitted via network connections to the other participants' user devices. In turn, participants receive the others' video and/or audio content via the network connections and observe the shared video and/or audio content using a display device and/or a speaker.

A primary objective of a videoconferencing session may be to enable participants to communicate and exchange ideas in a manner that most closely resembles an in-person meeting experience. Therefore, videoconferencing platforms may aim to accurately reflect the discourse from each participant's perspective. But because videoconferencing sessions are typically optimized for participants such that expressive context is readily perceived, active discussions or intense interchanges may not be conveyed effectively in every aspect for participants who depend on communication aids such as captioning, signing, subtitling, and the like, as well as non-verbal cues to discern the tenor of a discussion.

Such users may experience limited interaction and/or other types of accessibility issues when a cold read of a discussion thread is their only option.

According to exemplary embodiments, videoconferencing accessibility services are described. A user equipment (UE) device, such as a smart phone, laptop, desktop, and/or another type of computer device with a network connection and videoconferencing capabilities, may include a videoconferencing application configured to monitor and convey dialogue expressed during a videoconferencing session. The videoconferencing accessibility service may determine whether any of the participants of the session correspond to an accessibility-limited user requiring assistance in accessibility. As an example, a user may be determined to be an accessibility-limited user if a user profile indicates that the user is characterized as being deaf or hard of hearing. As another example, a user may be determined to be a non-native speaker of the designated language (or dialect/vernacular) for the session as specified by the host or determined from the invitees' user profiles. In some implementations, when a user is determined to be an accessibility-limited user, the user may be prompted to select an assisted mode and the user videoconferencing user interface may be configured to provide a customized level of communicative assistance accordingly. In other implementations, the user may be automatically prompted to confirm a default assistance mode via a user interface corresponding to the user's learned preferences from a previous videoconferencing session(s).

According to an exemplary embodiment, when a videoconferencing user profile identifies a user to be an accessibility-limited user, the videoconferencing accessibility service may activate an assistance mode of a type that correlates to the user's particular limitations and/or previous settings preferred by the user. The assistance mode may configure a user interface to capture and convey the expressive context of each of the statements made by the session participants. While monitoring the discourse, the videoconferencing accessibility service may enable conversion of captured audio from a videoconferencing session to text data, for example, using voice to text logic.

According to an exemplary embodiment, the user profiles may be automatically generated from video-based collaboration application/service set-up. For example, registration information associated with a user may include a user's accessibility information, user preferences (e.g., self-identified, learned, etc.), demographic information, collaboration session types, employment responsibilities, and the like. According to other embodiments, any of the user information may be obtained from other sources and/or by other means.

According to an exemplary embodiment, the videoconferencing accessibility service may enable analysis of the text data with respect to a set of audible parameters. For example, the analysis may be performed on the associated delivery measure objective and/or subjective parameters such as volume, pace or cadence, dialect or vernacular, demonstrative affect or emphasis, syntax, cross talk, repartee, and the like. The videoconferencing accessibility service may enable use of the audible parameters in determining an expressive context quality of each of the statements. Based on the expressive context qualities, the videoconferencing accessibility service may enable generation of a graphical interface for presentation to the accessibility-limited (or "assisted") user, select discussion threads having the expressive context indicators which may be designed to preserve the tenor of the discourse. For example, the expressive context indicators may correspond to edits to the text data in the form of descriptive tags including punctuation, inserted symbols, formatting effects (e.g., bolding, all caps, font size or dynamics, color codes, etc.), parenthetical explanations, emojis, and the like. In some embodiments, the expressive context indicators may indicate that session participants are talking over each other (i.e., engaging in cross talk). In some embodiments, the discussion thread is presented using a sign language interpreter (e.g., live and/or a bot) together with a graphic indicator such as a representational discussion intensity meter that corresponds to the number of participants cross talking, disruptions, elevating volume, and the like. According to an exemplary embodiment, the user interface may prompt the assisted user to select a mode for responding to the cross talking-participants individually or collectively in a single response.

According to an exemplary embodiment, the videoconferencing accessibility service may convert statements expressed in the videoconferencing session by the assisted user into assisted expression such as translated signing, captioning, and/or text-to-audio. The assisted expression may be used to generate a graphical interface for presenting the assisted expression via the participant's videoconferencing applications executing on their user devices. As an example, the graphical interface may include an avatar for the accessibility-limited user that "voices" the dialogue expressed by the user during the session. The avatar may exhibit facial expressions and/or other animations corresponding to the expressive context of the dialogue.

According to an exemplary embodiment, an assisted user may opt to use an alternate graphical representation or persona to represent the assisted user as a customized avatar in place of a captured picture or video image. For example, the assisted user's (or any participant's) facial expressions and/or gestures may be extracted in real-time and applied to the customized avatar in the form of a graphic object. An assisted user's pre-recorded motion may be used as a basis for rendering avatar movement. In one embodiment, the assisted user's avatar may be associated with a unique universal identifier (UUI) for the user.

According to exemplary embodiments, the videoconferencing application may obtain real-time motion data and map the data to the assisted user's currently active avatar. The videoconferencing application may be configured to enable the avatar to mimic or replicate real-life gestures and or facial expressions of the assisted user and simulate live action by the avatar. The videoconferencing application may generate and provide rendering data for presentation of the animated avatar via a video-based collaboration session to the other participants. For example, the avatar may express statements from the assisted user in a contextually appropriate manner as indicated by the assisted user or as detected by the videoconferencing application.

According to exemplary embodiments, the videoconferencing accessibility service may manage videoconferencing sessions associated with the videoconferencing application running on UE devices. The videoconferencing accessibility service may use machine learning (ML) and/or artificial intelligence (AI) to continuously update videoconferencing application user profiles containing user preferences with respect to videoconferencing assistance modes, language fluency, user device type, communicative limitations, etc.

FIG. 1 is a diagram illustrating an exemplary environment 100 in which an exemplary embodiment of a videoconferencing accessibility service may be implemented. As illustrated, environment 100 may include a network 102 including network devices 105 (also referred to individually or generally as network device 105). Additionally, as illustrated, environment 100 may include end devices 130 (also referred to individually or generally as end device 130).

The number, type, and arrangement of networks illustrated and described in environment 100 are exemplary. For example, according to other exemplary embodiments, environment 100 may include fewer networks, additional networks, and/or different networks.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices illustrated and described are exemplary. For purposes of description, an end device is not considered a network device.

Environment 100 includes communication links between the network devices and between end devices and a network. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1 and potentially not illustrated in other figures of the disclosure. A direct communicative connection may not involve an intermediary device and/or an intermediary network. The number, type, and arrangement of communication links illustrated and described in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface (e.g., proprietary, etc.).

Referring to FIG. 1, network 102 may include one or multiple types of networks of one or multiple types of technologies. Network 102 may be implemented to include a cloud network, a private network, a public network, an application layer service network, the Internet, a packet data network (PDN), a service provider network, a data center, a radio access network (RAN), a core network, and/or another type of network that may provide access to and may provide an exemplary embodiment of the videoconferencing accessibility service.

According to an exemplary embodiment, network 102 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology.

Depending on the implementation, network 102 may include one or multiple types of network devices, such as network devices 105. For example, network devices 105 may include a multi-access edge computing (MEC) device or another type of application layer service network device (e.g., cloud device, a server device, a web server device, etc.) that may provide a videoconferencing accessibility service. Network devices 105 may include a network device that hosts a video-based collaboration application/service. According to various exemplary embodiments, the video-based collaboration application/service may include the videoconferencing accessibility service, or the videoconferencing accessibility service may be a standalone service (e.g., a microservice) that may interface (e.g., via an application programming interface (API) (e.g., representational state transfer (REST) API) with a third party video-based collaboration application/service.

Network device 105 may include analytics that determine assistance mode selection for generation of a graphical videoconferencing interface associated with a user and a videoconferencing session with other participants. According to an exemplary embodiment, the analytics may include computer vision logic and/or other types of ML/AI logic that may analyze data (e.g., in real-time) based on one or multiple types of criteria. For example, the criteria may include facial expression detection, speech characteristics, gesticulations, and the like associated with the session participants. As described herein, the videoconferencing accessibility service logic may automatically set a videoconferencing assistance mode for a user based on a communication assistance level associated with the user. The videoconferencing accessibility service logic may include determinations as to an expressive context quality of the discourse. For example, multiple audible parameters may be selected for use in calculating a relative expressive context quality for the discourse. According to an exemplary embodiment, measurements regarding a speech volume, cadence, emotional affect (e.g., inflection, intonation, etc.), syntax, dialect, gesticulations, and the like are used to determine an expressive context quality. The expressive context quality may be indexed to expressive context indicators to be used in tagging, for example, discussion threads corresponding to the session discourse.

According to some exemplary embodiments, videoconferencing accessibility service logic may be implemented according to various architectures, such as an SFU, an MCU, a P2P, an XDN, or another type of suitable configuration or architecture that may support video-based communication, conferencing, and/or meeting collaboration among end devices 130, as described herein.

According to an exemplary embodiment, network device 105 may include an ML/AI engine to configure an accessible meetings bot having a sign language feature. For example, the ML/AI engine may convert audio of the session discourse into text data. For example, the text data may include closed caption scripts or the like. The ML/AI engine may then convert the text data into sign language translation video. For example, the ML/AI engine may map video clip cartridges of sign language translation that corresponds to session discourse. The video clips may be combined into a substantially real-time sign language video for forwarding to the assisted user via a graphical interface provided via the videoconferencing application executing on and device 130 associated with the assisted user.

According to an exemplary embodiment, network device 105 may include an ML/AI engine that configures the accessible meetings bot to convert sign language from the assisted user into text data. For example, the text data may include closed caption scripts, voiced audio, or the like. For example, the ML/AI engine may map the live signing to cartridges of translation to text and audio data that corresponds to sign language translation. The sign translation may be performed in a substantially real-time manner for forwarding to the other participants in the session via a graphical interface provided via the videoconferencing application executing on end devices 130 associated with the participants. The ML/AI engine may determine that a collaborative session is a recurring and/or regularly scheduled meeting, and accordingly configure a particular template assistive bot and/or a user interface presentation layout. For example, daily sync-ups may use a default user interface and/or an AI avatar, which may be a selected based on popularly used avatars within an enterprise/organization for similar collaborative session having similar participants user profiles.

According to an exemplary embodiment, network device 105 may include user management logic. For example, the user management service may provide a user interface (e.g., a graphical user interface (GUI)) that enables the user to manage and configure settings and user preferences relating to the videoconferencing assistance service. For example, the user may be able to configure parameters, parameter values, and/or user preferences relating to initiating the videoconferencing assistance service, including selection and use of pre-trained gesticulations, selection of mappings between a demonstrative gesticulation and its meaning, selection and mappings of the predominant languages and/or dialects spoken by the other participants, and/or other types of user preferences that may be configurable by the user, as described herein. According to an exemplary embodiment, the user management service may select the layout of the GUI to optimize the conveyance of the expressive context of the discourse among the participants, to one or more assisted users.

Additionally, network devices 105 may include various network devices of a RAN. For example, the RAN may be implemented to include a Fifth Generation (5G) RAN, a future generation RAN (e.g., a 5.5 RAN, a Sixth Generation (6G) RAN, a Seventh Generation (7G) RAN, or a subsequent generation RAN), a centralized-RAN (C-RAN), an Open Radio Access Network (O-RAN), and/or another type of access network (e.g., a Fourth Generation (4G) RAN, a 4.5G RAN, etc.). By way of further example, network devices 105 may include a next generation Node B (gNB), an evolved Long Term Evolution (LTE) (eLTE) evolved Node B (eNB), an eNB, a radio network controller (RNC), a remote radio head (RRH), a baseband unit (BBU), a radio unit (RU), a remote radio unit (RRU), a centralized unit (CU), a distributed unit (DU), a 5G ultra-wide band (UWB) node, a future generation wireless access device (e.g., a 6G wireless station, a 7G wireless station, or another generation of wireless station), and/or the like. The network device(s) of the RAN may support communication and connectivity between end device 130 and other network devices 105 of network 102 and the videoconferencing accessibility service, as described herein.

Further, network devices 105 may include network devices of a core network. The core network may include a complementary network of the RAN. For example, the core network may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network. Depending on the implementation of the core network, the core network may include diverse types of network devices, such as a user plane function (UPF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network exposure function (NEF), a mobility management entity (MME), a packet gateway (PGW), a serving gateway (SGW), a home subscriber server (HSS), an authentication, authorization, and accounting (AAA) server, a policy and charging rules function (PCRF), a policy and charging enforcement function (PCEF), a charging system (CS), and/or another type of network device that may be well-known but not particularly mentioned herein.

End device 130 may include a device that has communication capabilities and computational capabilities. End device 130 may be implemented to include a mobile device, a portable device, and/or a stationary device (e.g., a non-mobile device and/or a non-portable device). For example, end device 130 may be implemented to include a smartphone, a mobile phone, a tablet, a netbook, a computer (e.g., desktop, laptop, etc.), a room system, or another type of user equipment (UE). End device 130 may include one or multiple peripheral devices, such as a display, a camera, and/or a microphone. According to an exemplary embodiment, end device 130 may include multiple cameras. As an example, a camera may be implemented as a separate or peripheral device (e.g., a web cam or another type of video camera) or may be integrated (e.g., a laptop computer with a camera, a mobile phone with a camera).

End device 130 may be configured to execute various types of software (e.g., applications, programs, etc.). The number and the types of software may vary among the end devices 130. According to an exemplary embodiment, end device 130 may include software that enables video-based communication, conferencing, and/or meeting collaboration between end devices 130. According to an exemplary embodiment, the videoconferencing accessibility service may interface (e.g., via an API) with a third party video-based communication software. According to another exemplary embodiment, the videoconferencing accessibility service may be included in a standalone and proprietary video-based communication software. For purposes of description, examples of video-based communication software may include BLUEJEANS™, and the like.

According to some exemplary embodiments, end device 130 may provide the videoconferencing accessibility service, as described in relation to network device 105. According to other exemplary embodiments, network device 105 and end device 130 may collaboratively provide the videoconferencing accessibility service in which one or more processes, functions, steps, and/or services, in whole or in part, may be performed by network device 105 and end device 130.

Figure 2:
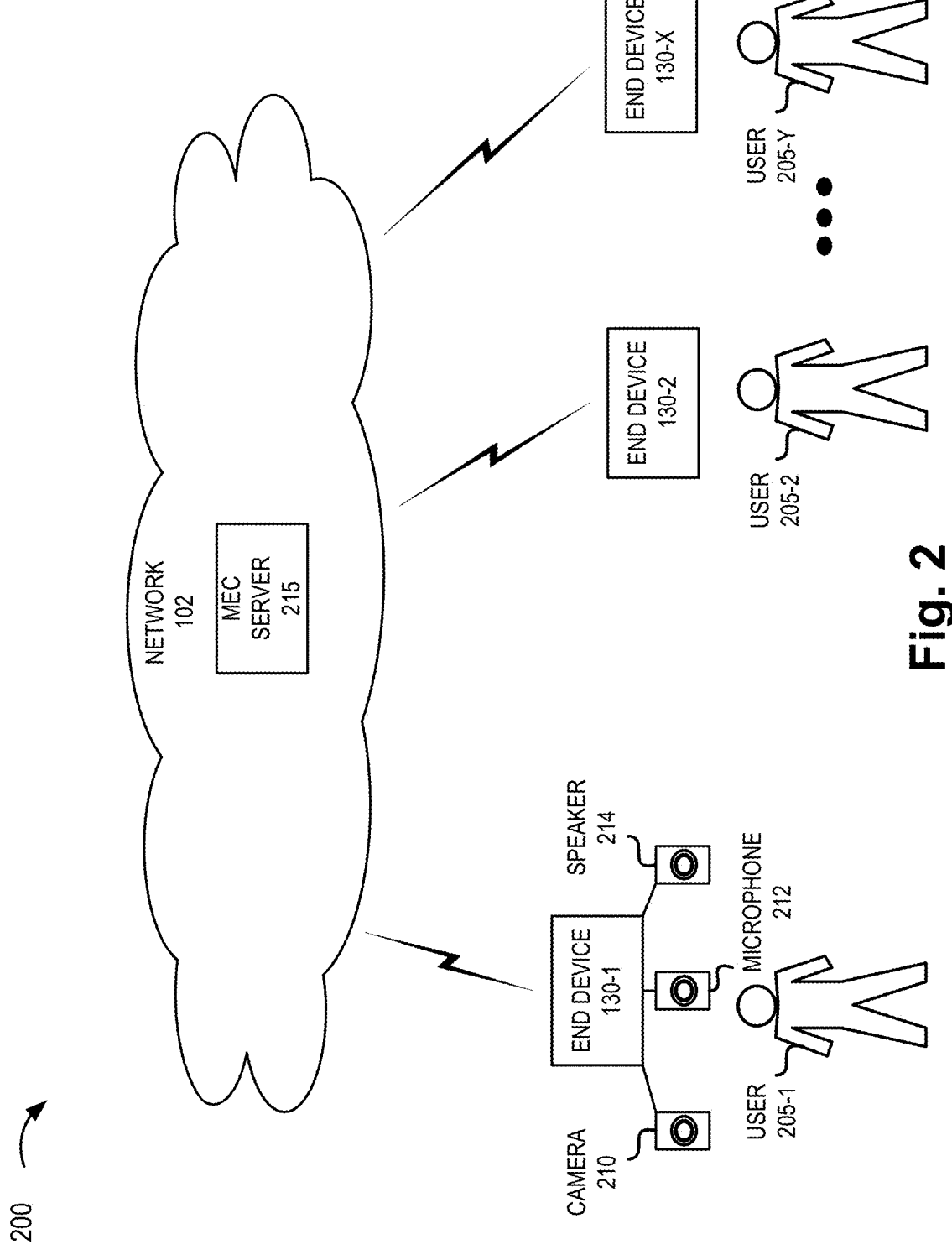
FIG. 2 is a diagram illustrating another exemplary environment in which an exemplary embodiment of the video-conferencing accessibility service may be implemented.

FIG. 2 is a diagram illustrating another exemplary environment in which an exemplary embodiment of the videoconferencing accessibility service may be implemented. As illustrated, environment 200 may include network 102 and end devices 130 (e.g., end devices 130-1 through 130-X, where X>2), which include displays as have been previously described. As further illustrated, environment 200 includes users 205-1 through 205-Y, where Y>2 (also referred to as users 205 and generally or individually as user 205), camera 210, microphone 212, speaker 214, and a MEC server 215. User 205 may be a person participating in a video-based collaboration session, such as a videoconferencing session. User 205 may operate end device 130. Camera 210, microphone 212, and/or speaker 214 may be an integrated device or a peripheral/standalone device that captures/presents video and/or audio. MEC server 215 may be an implementation of network device 105.

The number of users 205, end devices 130, and devices 210-214 are exemplary. Although not illustrated, end devices 130-2 through 130-X may include at least one camera 210 (e.g., internally, peripherally, etc.), microphone 212, and/or speaker 214. According to this exemplary environment, MEC server 215 may host a video-based communication software. According to this exemplary environment, end device 130 may include logic that provides the videoconferencing accessibility service, as described herein.

Figure 3A:
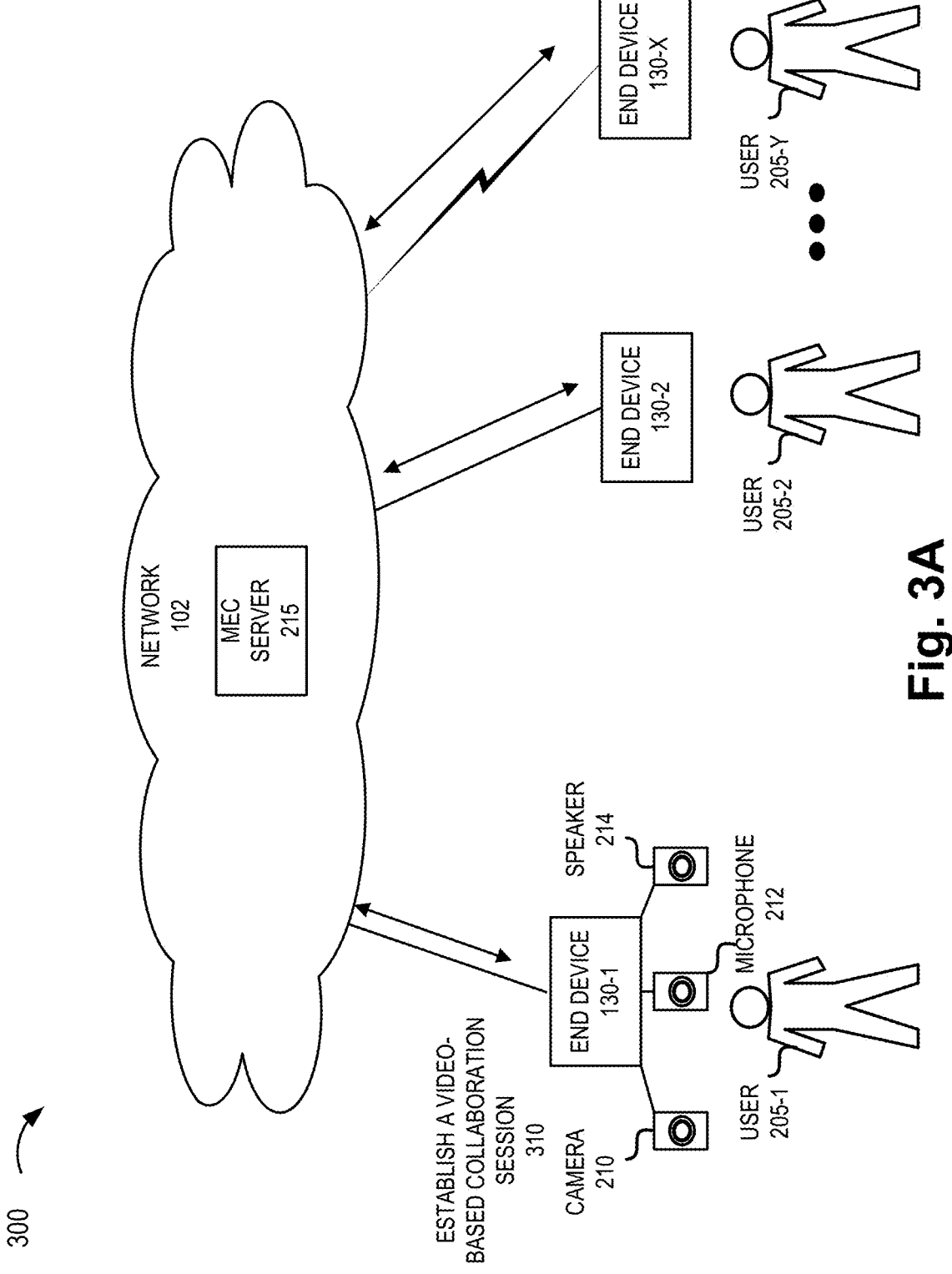
FIGS. 3A-3D are diagrams illustrating an exemplary process of an exemplary embodiment of the videoconferencing accessibility service.

FIGS. 3A-3D are diagrams illustrating an exemplary process 300 of an exemplary embodiment of the videoconferencing accessibility service. Referring to FIG. 3A, according to an exemplary scenario, assume users 205 wish to conduct a collaborative video-based meeting with each other via their resident videoconferencing applications. Also assume that, according to user profiles associated with users 205, at least user 205-1 has an accessibility limitation and selectively accesses the videoconferencing accessibility service via an accessibility mode. As illustrated, users 205 may establish a video-based collaboration session 310 with each other via network 102 and MEC server 215.

Figure 3B:
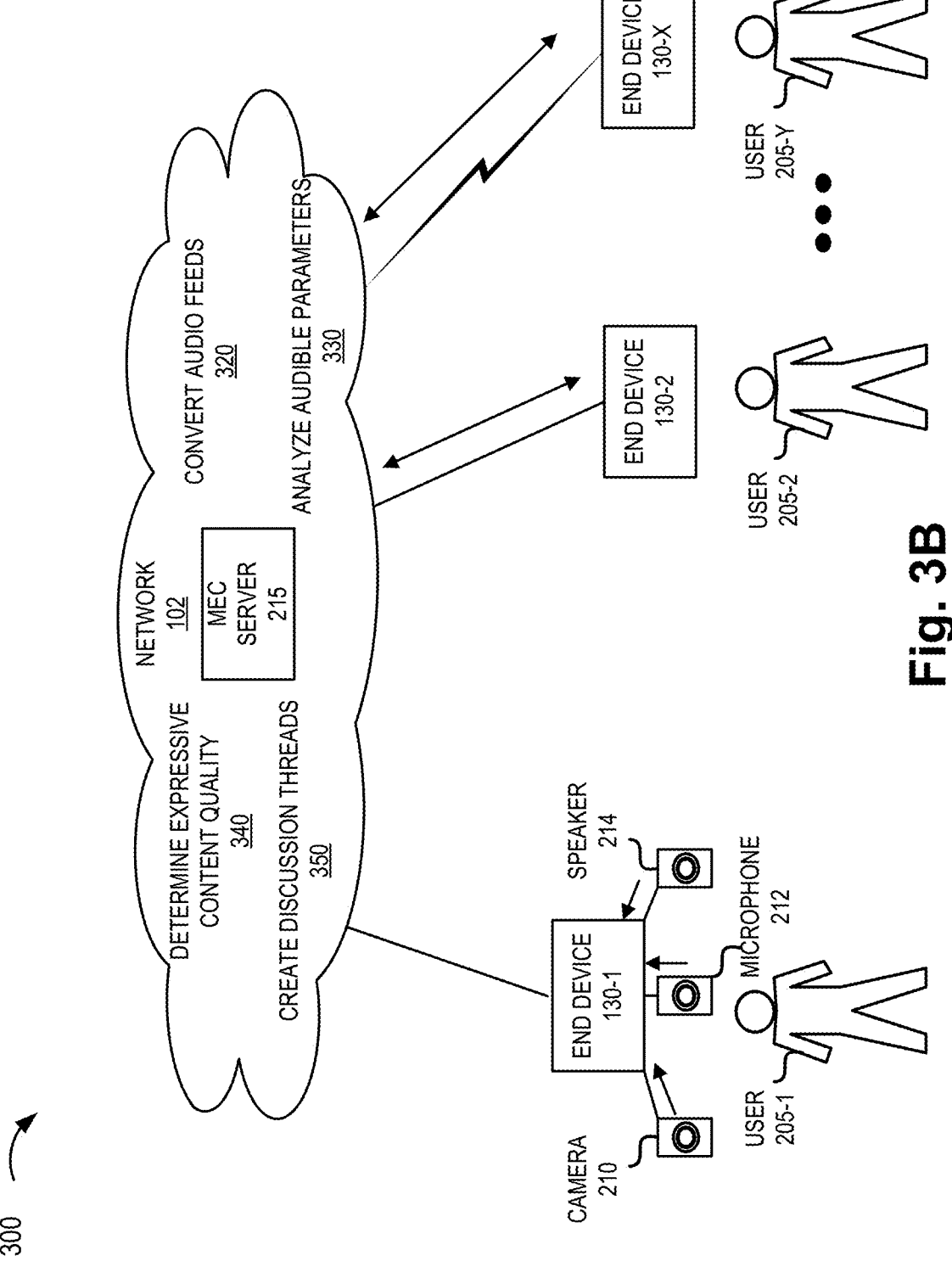

Referring to FIG. 3B, MEC server 215 may receive from end devices 130 audio feeds 320 (e.g., speech) during the video-based collaboration session, and may convert the audio feeds 310, for example, into text data. MEC server 215 may analyze the text data for audible parameters 315, such as volume, cadence, dialect, demonstrative affect (e.g., inflection, intonation, etc.), syntax, and the like. MEC server 215 may use the audible parameters to determine an expressive context quality (e.g., intensity, tenor, formality, language and/or dialect, and the like) of the session discourse 340. MEC server 215 may use the text data to create discussion threads 350 tagged with expressive context indicators corresponding to the determined expressive context qualities.

Figure 3C:
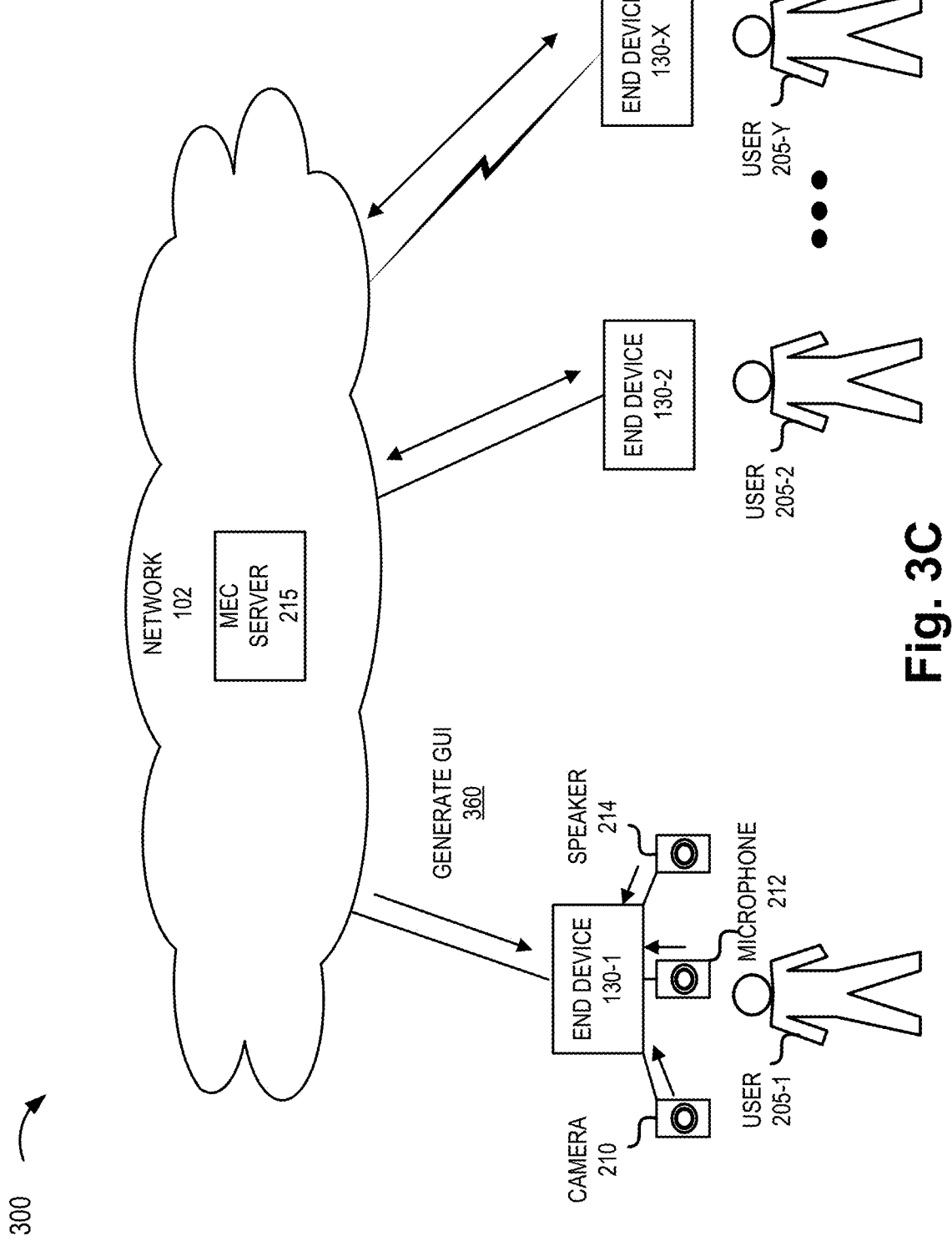

Referring to FIG. 3C, MEC server 215 may generate a graphical videoconferencing interface 360, and transmit the GUI to end device 130-1, for presenting select discussion threads to user 205-1 interacting with the videoconferencing application, as described herein.

Figure 3D:
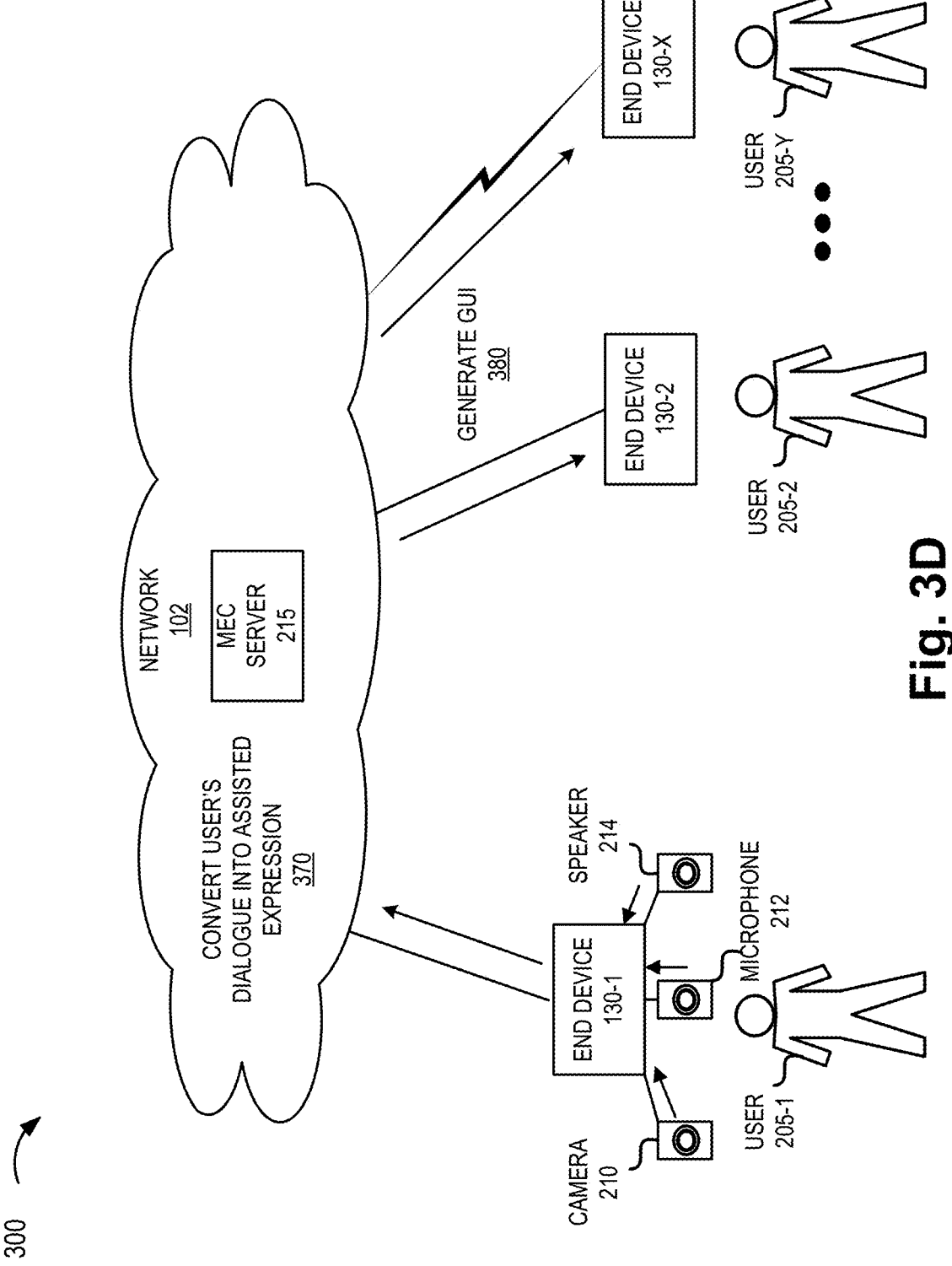

Referring to FIG. 3D, user 20-5-1 may use sign language captured via camera 210 to dialogue with other users 205 during the collaboration session, and MEC server 215 may convert the dialogue into an assisted expression 370. For example, MEC server 215 may convert the sign language into closed captioning text scripts. MEC server 215 may generate a GUI layout to present the closed captioning text to users 205 via end devices 130.

FIGS. 3A-3D illustrate and describe exemplary process 300 of an exemplary embodiment of the videoconferencing accessibility service, however according to other exemplary embodiments, the videoconferencing accessibility service may include additional, different and/or fewer operations relative to those illustrated and described. For example, end device 130-1 may transmit dialogue text input by user 205-1 to MEC server 215, and MEC server 215 may use text-to-speech procedures to convert the text to speech. According to an exemplary embodiment, MEC server 215 may generate a GUI that includes an avatar associated with user 205-1 for "voicing" the speech. In another embodiment, the accessibility limitation of user 205-1 may not be related to a physical infirmity, but instead correspond to a language barrier, and thus not involve a sign language bot. In other embodiments, other user 205 may be using various accessibility modes during the collaborative session.

Additionally, as previously described, the videoconferencing accessibility service may be implemented in whole or in part using user profiles stored and/or obtained by MEC server 215, which are automatically updated by an ML/AI engine that monitors video-based collaboration sessions.

Figure 4:
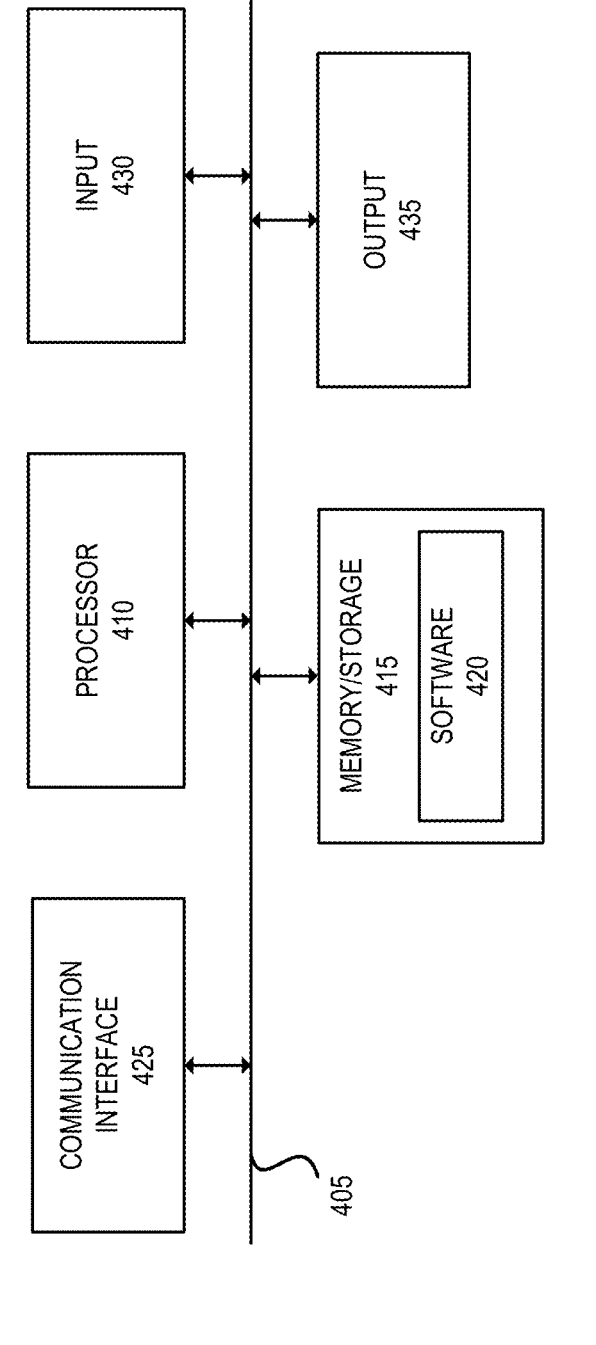
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to network devices 105, end device 130, camera 210, microphone 212, speaker 214, MEC server 215, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to end device 130, software 420 may include an application that, when executed by processor 410, provides a function and/or a process of the videoconferencing accessibility service, as described herein. Additionally, with reference to network device 105 or MEC server 215, software 420 may include an application that, when executed by processor 410, provides a function and/or a process of the videoconferencing accessibility service, as described herein. Software 420 may also include firmware, middleware, microcode, hardware description language (HDL), and/or another form of an executable (e.g., applet, script, or the like). Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, a camera, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, network devices 105 and/or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
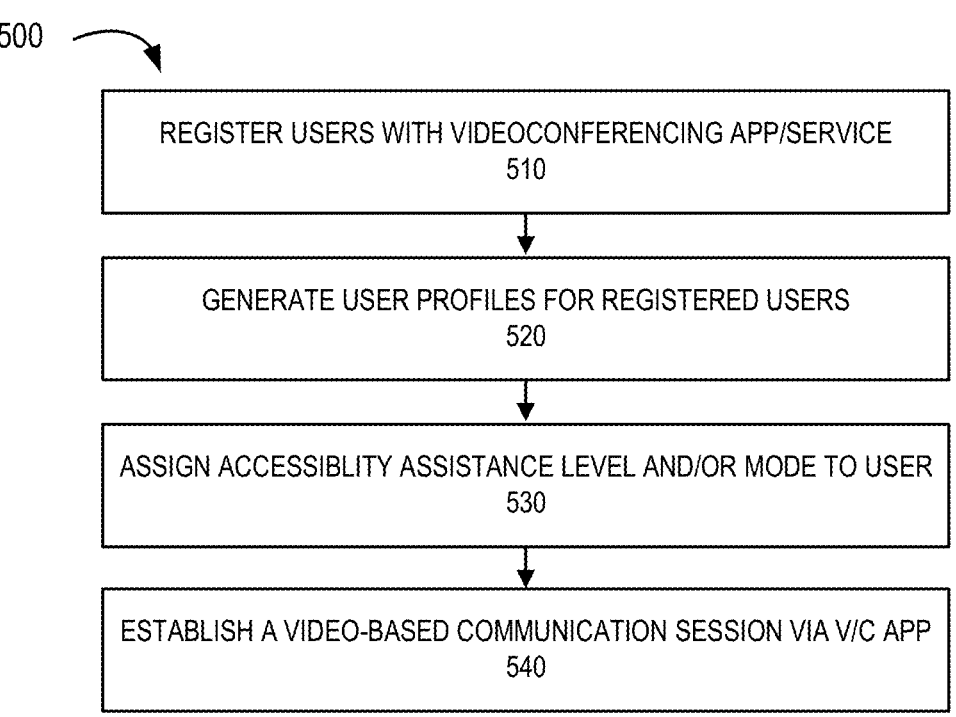
FIG. 5 is a flow diagram illustrating an exemplary process of an exemplary embodiment of the videoconferencing accessibility service.

FIG. 5 is a flow diagram illustrating an exemplary process 500 of an exemplary embodiment of the videoconferencing accessibility service. According to an exemplary embodiment, end device 130 may perform a step of process 500.

According to an exemplary implementation, processor 410 executes software 420 to perform the step of process 500, as described herein. Alternatively, the step may be performed by execution of only hardware. In this way, end device 130 and/or the card logic may be configured to perform a step of process 500. According to other exemplary embodiments, process 500 may be performed by a network device (e.g., end device 130, MEC server 215, etc.). For purposes of description, however, process 500 is described below in relation to network device 105.

Referring to FIG. 5, in block 510, network device 105 may perform a registration procedure for users enabling use of a videoconferencing application/service that is resident on or downloaded to network device 105. For example, registration of the videoconferencing application/service may be performed in connection with a subscription service.

In block 520, network device 105 may generate user profiles for the registered users. For example, a user profile may include device type information, demographic information, videoconferencing accessibility limitations, language fluencies, dialects, and the like. The information used to generate the user profiles may be self-reported and/or obtained from other sources and/or updated based on monitored video-based collaboration sessions.

In block 530, network device 105 may calculate an accessibility assistance level and/or corresponding accessibility mode associated with the user. In block 540, network device 105 may establish a video-based collaboration session via the videoconferencing application/services executing on end devices 130 of users 205.

FIG. 5 illustrates an exemplary embodiment of a process of the videoconferencing accessibility service, according to other exemplary embodiments, the videoconferencing accessibility service may perform additional operations, fewer operations, and/or different operations than those illustrated and described.

FIG. 6 is a flow diagram illustrating yet another exemplary process 600 of an exemplary embodiment of the videoconferencing accessibility service. According to an exemplary embodiment, network device 105 may perform a step of process 600. According to an exemplary implementation, processor 410 executes software 420 to perform the step of process 600, as described herein. Alternatively, the step may be performed by execution of only hardware. According to other exemplary embodiments, process 600 may be performed by end device 130. For purposes of description, however, process 600 is described below in relation to network device 105.

Referring to block 610 of FIG. 6, network device 105 may, having established a video-based collaboration session for intended participants, retrieve the user profiles associated with the identified session invitees. For example, network device 105 may receive an invitee list from the session host and map the names to current user profiles.

In block 620, network device 105 may determine, from the user profiles, whether any of the session invitees correspond to an accessibility-limited user. When network device 105 determines that none of the invitees require session accessibility assistance, (block 620-NO), process 600 may return to block to 610, in which additional user profiles may be identified for invitees subsequently added to the collaboration session. Alternatively, when network device 105 determines that an invitee is an accessibility-limited user (block 620-YES), network device 105 may proceed with monitoring the discourse of the collaboration session and converting the audio into text data (block 630). It should be noted that in certain scenarios, the user profile may not categorize the associated user as accessibility-limited, but for the purposes of the current collaboration the user's status as accessibility-limited may be based on the user's language fluency relative to the predominant language of a threshold number of the other participants.

In block 640, network device 105 may analyze the text data with respect to audible parameters. For example, the text data may include a timestamp associated with the associated audio, and procedures for determining volume, cadence, dialect, demonstrative affect, and/or syntax, and the like can be performed.

In block 650, network device 105 may, based on the audible parameters, determine an expressive context quality associated with the discourse. For example, inferences can be drawn from the audible parameters pertaining to qualities such as tenor, intensity, and the like.

In block 660, network device 105 may generate discussion threads that correspond to a transcript of the discourse, which are tagged with corresponding expressive context indicators mapped to the determined expressive context qualities. For example, the indicators may include adding text to the discussion threads, punctuation, a formatting effect, a parenthetical explanation, an emoji, a color-coded graphic, a gauge or meter, or the like.

In block 670, network device 105 may generate a graphical user interface in a layout that optimizes presentation of select ones of the discussion threads via the assisted user's videoconferencing application/service in real-time during the collaboration session. For example, the discussion threads may be in the form of closed captioning or subtitles, sign language, avatars "voices," and the like.

In block 680, network device 105 may convert the assisted user's dialogue during the collaboration session into assisted expression. For example, the user's sign language maybe translated by a sign language bot into closed captioning text scripts, which may in turn be converted to speech. In block 690, network device 105 may generate a GUI having a layout that optimizes the presentation of the assisted user's assisted expression via the videoconferencing applications/services of the other participants. Network device 105 may repeat steps 630-690 of process 600 for the duration of the collaboration session and/or until every assisted participant has signed off the session.

FIG. 6 illustrates an exemplary embodiment of a process of the videoconferencing accessibility service, according to other exemplary embodiments, the videoconferencing accessibility service may perform additional operations, fewer operations, and/or different operations than those illustrated and described.

Figure 7:
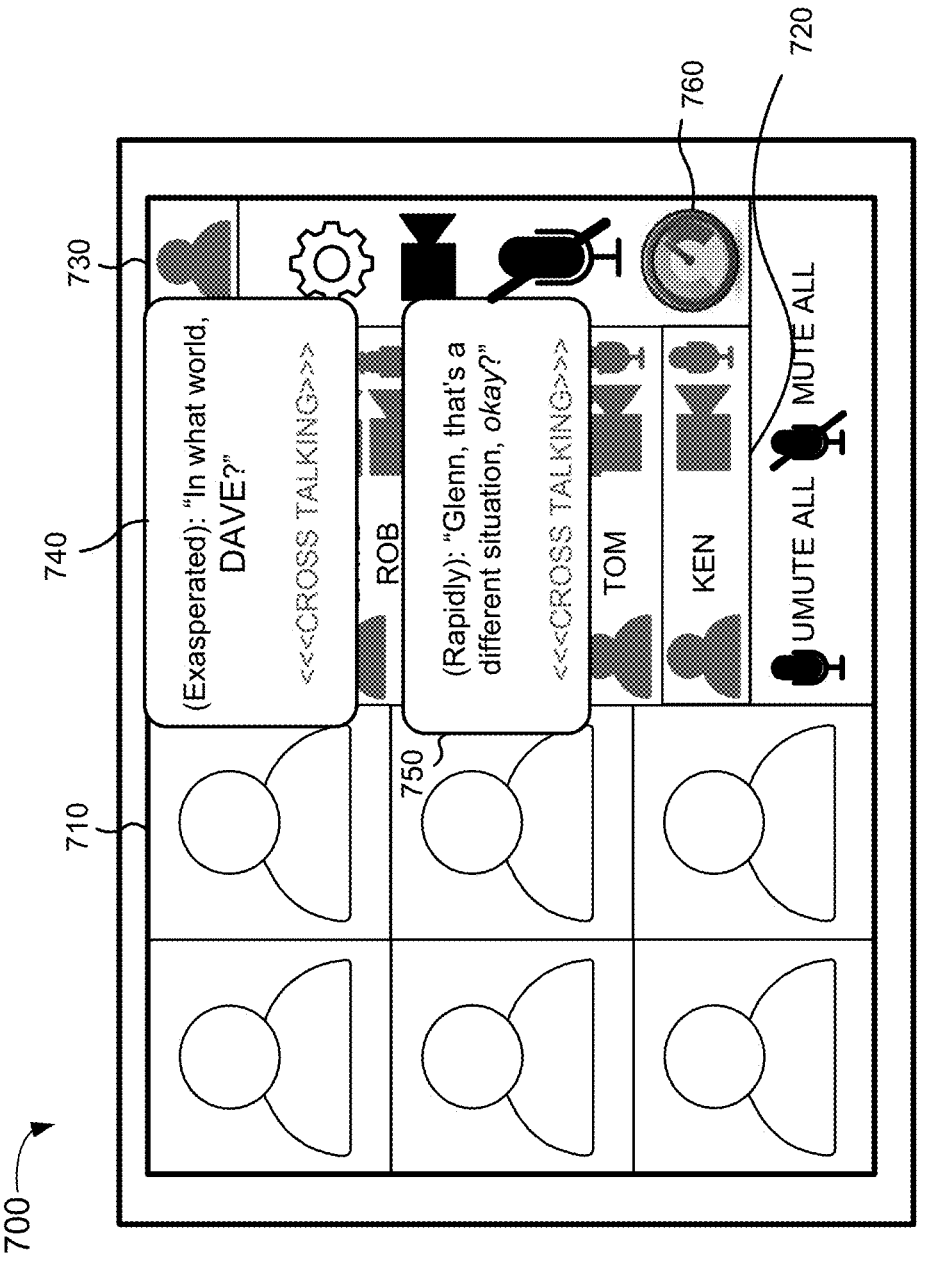
FIG. 7 is an exemplary layout of a graphical interface generated in an exemplary embodiment of the videoconferencing accessibility service.

FIG. 7 illustrates an exemplary user interface 700 according to an exemplary embodiment described herein and displayed on end device 130-1 of accessibility-limited user 205-1. As shown in FIG. 7, user interface 700 may include a video feed section 710, a participants section 720, and a settings section 730. Video feed section 710 may include video feeds from users participating in a video-based collaboration session. Participants section 720 may include information relating to the participants of the collaboration session. Settings section 730 may include a set of settings for the collaboration session. User interface 700 may further include discussion threads 740 and 750 associated with discourse obtained from the collaboration session, each of which are enhanced with expressive content identifiers. For example, discussion thread 740 includes a parenthetical descriptor ("Exasperated"), added punctuation, and an indication that the participants are engaged in cross talk, while discussion thread 750 includes a parenthetical descriptor ("Rapidly"), added punctuation, and the indication of cross talk. User interface 700 may further include a discussion intensity (or animation) meter 760 that corresponds to a qualitative representation of the expressive context of the collaboration session discourse.

According to an exemplary embodiment of the videoconferencing accessibility service, an assistive presentation mode prediction model is configured to create accessibility assistive bots and presentation interfaces. For example, a prediction logic may use routine video-based collaboration session datasets for generating an initial avatar for participants. The datasets may include user profile data, meeting agendas, official duties of the participants, native languages, demographics, user-reported preferences. Additionally, or alternatively, the prediction logic may use referencing datasets of similar types of meetings of users with similar user profiles to create initial avatar characters, and/or datasets using enterprise or organizational policies, meeting formats, human relations guidelines to create an AI avatar and user interface. In some embodiments, these rules may bay pre-configured in the form of training data, for example, and templates with boundary conditions. In some embodiments, the AI/ML logic may update initial avatars' presentations styles and user interface presentation format based on detected live session characteristics such as the discourse context qualified as jovial, calm, spirited, or aggressive, for example.

In one embodiment, the videoconferencing accessibility assistance service may enter an active discussion mode. For example, the ML/AI engine may detect a mid- to aggressive-discourse during a video-based collaboration session. In the active discussion mode, the ML/AI engine may take over control of the session, such as the translation an interface presentation layout and the assistive bots' response generation based on the identification of the participants' intent and pace of expression. In one use case, a video-based collaboration session may include an agenda for a re-organization decision, and the discourse may devolve into an argument with increased volume of speech and occurrences of cross talking. In response, the ML/AI engine may assume control over the session and presentation layout exhibiting the "tone" of the session and the contextual backdrop of the statements made by the participants. In this manner, the assisted user(s) may be made aware of that context. The statements expressed by the assisted user may be enhanced to indicate the context of the user's response (e.g., loud and firm).

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations. The term "substantially" is used herein to represent the inherent degree of uncertainty that may be attributed to any quantitative comparison, value, measurement, or other representation. The term "substantially" is also used herein to represent the degree by which a quantitative representation may vary from a stated reference without resulting in a change in the basic function of the subject matter at issue.

In addition, while a series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
identifying, by a device, a user profile for a user of a videoconferencing application to access a videoconferencing session;
converting, by the device, audible statements expressed by participants of the videoconferencing session to text data;
determining, by the device, an expressive context quality of the text data;
creating, by the device using the text data and the expressive context quality, discussion threads and corresponding expressive context indicators; and
generating, by the device based on the user profile, a graphical interface including select ones of the discussion threads including one or more of the expressive context indicators for presenting via the videoconferencing application,
wherein the expressive context indicators include at least one of a parenthetical explanation of the expressive context of the text data or an emoji representing the expressive context of the text data.

2. The method of claim 1, further comprising:
automatically generating the user profile based on at least one of the user's accessibility information, self-identified user preferences, demographics, collaboration session type, employment responsibilities, or observed behavior related to the videoconferencing application.

3. The method of claim 1, wherein determining the expressive context quality includes:
analyzing the audible statements with respect to multiple audible parameters.

4. The method of claim 3, wherein analyzing the audible statements with respect to multiple audible parameters includes:
detecting at least one of a volume, a pace, a dialect, a demonstrative affect, or a syntax.

5. The method of claim 1, further comprising:
generating, based on the user profile, an avatar corresponding to the user; and
using the avatar via the graphical interface to convey to the participants statements expressed by the user.

6. The method of claim 1, wherein generating the graphical interface includes:
generating an intensity meter indicating a level at which multiple statements expressed by a number of participants are occurring simultaneously; and prompting the user to select a mode for responding individually to select ones of the number of participants or collectively to the number of participants in a single response.

7. A device comprising:
a processor configured to:
identify a user profile for a user of a videoconferencing application to access a videoconferencing session;
convert audible statements expressed by participants of the videoconferencing session to text data;
determine an expressive context quality of the text data;
create, using the text data and the expressive context quality, discussion threads and corresponding expressive context indicators; and
generate, based on the user profile, a graphical interface including select ones of the discussion threads including one or more of the expressive context indicators for presenting via the videoconferencing application,
wherein the expressive context indicators include at least one of a parenthetical explanation of the expressive context of the text data or an emoji representing the expressive context of the text data.

8. The device of claim 7, wherein the processor is further configured to:
automatically generate the user profile based on at least one of the user's accessibility information, self-identified user preferences, demographics, collaboration session type, employment responsibilities, or observed behavior related to the videoconferencing application.

9. The device of claim 7, wherein to determine the expressive context quality the processor is configured to:
analyze the audible statements with respect to multiple audible parameters.

10. The device of claim 9, wherein to analyze the audible statements with respect to multiple audible parameters, the processor is configured to:
detect at least one of a volume, a pace, a dialect, a demonstrative affect, or a syntax.

11. The device of claim 7, wherein the processor is further configured to:
generate, based on the user profile, an avatar corresponding to the user; and
use the avatar via the graphical interface to convey to the participants statements expressed by the user.

12. The device of claim 7, wherein, to generate the graphical interface, the processor is further configured to:
generate an intensity meter to indicate a level at which multiple statements expressed by a number of participants are occurring simultaneously; and
prompt the user to select a mode for responding individually to select ones of the number of participants or collectively to the number of participants in a single response.

13. A non-transitory computer-readable storage medium storing instructions executable by a processor of a device, wherein the instructions are configured to:
identify a user profile for a user of a videoconferencing application to access a videoconferencing session;
convert audible statements expressed by participants of a videoconferencing session to text data;
determine an expressive context quality of the text data;
create, using the text data and the expressive context quality, discussion threads and corresponding expressive context indicators; and
generate, based on the user profile, a graphical interface including select ones of the discussion threads including one or more of the expressive context indicators for presenting via the videoconferencing application, wherein the expressive context indicators include at least one of a parenthetical explanation of the expressive context of the text data or an emoji representing the expressive context of the text data.

14. The non-transitory computer-readable storage medium of claim 13, wherein the instructions are further configured to:

automatically generate the user profile based on at least one of the user's accessibility information, self-identified user preferences, demographics, collaboration session type, employment responsibilities, or observed behavior related to the videoconferencing application.

15. The non-transitory computer-readable storage medium of claim 13, wherein the instructions to determine the expressive context quality are further configured to:

analyze the audible statements with respect to multiple audible parameters.

16. The non-transitory computer-readable storage medium of claim 15, wherein the instructions to analyze the audible statements with respect to multiple audible parameters are further configured to:

detect at least one of a volume, a pace, a dialect, a demonstrative affect, or a syntax.

17. The non-transitory computer-readable storage medium of claim 13, wherein the instructions are further configured to:

generate, based on the user profile, an avatar corresponding to the user; and use the avatar via the graphical interface to convey to the participants statements expressed by the user.

18. The method of claim 1, wherein the expressive context indicators include indications of participants of the videoconferencing session engaging in cross talk.

19. The device of claim 7, wherein the expressive context indicators include indications of participants of the videoconferencing session engaging in cross talk.

20. The non-transitory computer-readable storage medium of claim 13, wherein the instructions to generate the graphical interface are configured to:

generate an intensity meter to indicate a level at which multiple statements expressed by a number of participants are occurring simultaneously.

\* \* \* \* \*